US012723134B2

(12) United States Patent
Schneider et al.

(10) Patent No.: US 12,723,134 B2
(45) Date of Patent: Sep. 1, 2026

(54) MODELING MATERIAL AND METHOD FOR THE PRODUCTION THEREOF

(71) Applicant: STAEDTLER SE, Nuremberg (DE)

(72) Inventors: Denise Schneider, Nuremberg (DE); Sabina Herdegen, Kastl (DE); Mathias Belzner, Cadolzburg (DE)

(73) Assignee: STAEDTLER SE, Nuremberg (DE)

( * ) Notice: Subject to any disclaimer, the term of this patent is extended or adjusted under 35 U.S.C. 154(b) by 597 days.

(21) Appl. No.: 17/921,891

(22) PCT Filed: Apr. 23, 2021

(86) PCT No.: PCT/EP2021/025152
§ 371 (c)(1),
(2) Date: Oct. 27, 2022

(87) PCT Pub. No.: WO2021/223908
PCT Pub. Date: Nov. 11, 2021

(65) Prior Publication Data

US 2023/0167249 A1 Jun. 1, 2023

(30) Foreign Application Priority Data

May 5, 2020 (DE) .................... 10 2020 002 686.9

(51) Int. Cl.

| | |
|---|---|
| ***C08J 3/18*** | (2006.01) |
| ***C08K 3/013*** | (2018.01) |
| ***C08K 5/00*** | (2006.01) |
| ***C08K 5/101*** | (2006.01) |
| ***C08K 5/11*** | (2006.01) |

(52) U.S. Cl.
CPC ................ *C08J 3/18* (2013.01); *C08K 3/013* (2018.01); *C08K 5/0016* (2013.01); *C08K 5/101* (2013.01); *C08K 5/11* (2013.01); *C08J 2327/06* (2013.01)

(58) Field of Classification Search
CPC ......... C08J 3/18; C08J 2327/06; C08K 3/013; C08K 5/0016; C08K 5/101; C08K 5/11
See application file for complete search history.

(56) References Cited

U.S. PATENT DOCUMENTS 3,700,616 A * 10/1972 Zawadzki .............. C08L 67/02 524/297
3,849,365 A * 11/1974 Bauer et al. .............. C08J 3/22 523/322
6,350,400 B1 * 2/2002 Piotrowski ................ C08J 3/18 264/211
10,207,425 B2 * 2/2019 Wolf ........................ B29B 9/10
2007/0135562 A1 * 6/2007 Freese ...................... C08K 5/11 524/567
2013/0066000 A1 3/2013 Freese
2020/0156069 A1 5/2020 Weber
2021/0162403 A1 6/2021 Brettschneider
2022/0017735 A1 1/2022 Wunderlich

FOREIGN PATENT DOCUMENTS

DE 2515757 A1 10/1976
DE 19723467 A1 12/1998
DE 102004056923 A1 * 6/2006 ............ A44C 27/00
DE 102005059143 A1 6/2007
DE 102015226417 A1 6/2017
DE 102018007756 A1 4/2020
EP 3406340 A1 11/2018
GB 1505697 A 3/1978
WO 2020069777 A1 4/2020

OTHER PUBLICATIONS

German Office Action Dated Jun. 16, 2022, 4 Pages.
European Search Report Dated Nov. 6, 2020, 2 Pages.
European Search Report Dated Jul. 7, 2021, 2 Pages.
English Translation of International Preliminary Report on Patentability Dated Nov. 22, 2022, International Application No. PCT/EP2021/025152, 7 Pages.

* cited by examiner

*Primary Examiner* — James C Goloboy
(74) *Attorney, Agent, or Firm* — LUCAS & MERCANTI, LLP; Klaus P. Stoffel

(57) ABSTRACT

An oven-hardening modeling material, at least including a binder and a softener, the binder and the softener being in the form of a plastisol, the plastisol being essentially composed of PVC and plasticizer and the mass having an overall plasticizer content of 32 to 60 wt. %.

7 Claims, No Drawings

MODELING MATERIAL AND METHOD FOR THE PRODUCTION THEREOF

CROSS-REFERENCE TO RELATED APPLICATIONS

The present application is a 371 of International application PCT/EP2021/025152, filed Apr. 23, 2021, which claims priority of DE 10 2020 002 686.9, filed May 5, 2020, the priority of these applications is hereby claimed and these applications are incorporated herein by reference.

BACKGROUND OF THE INVENTION

The invention relates to an oven-hardenable modeling compound and a method for producing such modeling compounds.

Plastic, oven-hardenable compounds for molding and modeling objects are known in principle.

Modeling compounds are also understood to mean so-called clays or, in the case of polymer-containing compounds, polymer clays.

DE 25 15 757 C3 discloses a plastic compound that can be deformed by hand and hardened by heating.

Such a compound substantially consists of polyvinyl chloride (PVC), filler and phthalate-containing plasticizers.

DE 10 2005 059 143 A1 also discloses modeling compounds that do not use phthalate-containing plasticizers.

The disadvantage of such compounds according to the prior art is that they are not resistant to aging and the blocks of modeling compound exhibit an increase in hardness after prolonged storage, even in unopened packaging. The modeling compound is difficult for the user to knead as a result.

This still represents the ideal case of aging, because long storage times can even lead to modeling blocks becoming unusable, since they can no longer be kneaded by hand.

This is due to the fact that the plasticizer in the compound already exhibits interactions at room temperature. This is referred to as an aging process of PVC-containing modeling compounds in the unhardened state.

For modeling compounds according to the prior art, the powdery raw materials are mixed with the plasticizer at temperatures between 20 and 30° C. A plasticizer absorption of 25-30% by weight is achieved. Individual PVC agglomerates disintegrate in the course of time, for example, during longer storage, which in turn generates a need for plasticizers since the surface of the PVC grains has increased.

In this case, the plasticizer previously stored in the intermediate spaces between the PVC particles, which is largely responsible for the soft kneading behavior of the modeling compound, is no longer present. Instead, the plasticizer accumulates on the newly created surfaces of the disintegrated agglomerates. The hardness of the unhardened modeling compound increases over time as a result of this phenomenon.

SUMMARY AND DESCRIPTION OF THE INVENTION

The object of the invention is therefore to create a modeling or molding compound that does not have the disadvantages mentioned above and in particular to minimize the aging process during storage of PVC-containing modeling compounds in the unhardened state, thus ensuring greater storage stability.

A further object of the invention is to increase the flexibility of the modeling compound after bake hardening and, optionally, to improve the transparency, up to glass clarity, of the hardened compound.

In addition, the object of the invention is to create a method with which such compounds can be produced.

The oven-hardenable modeling compound according to the invention consists at least of a binder and a plasticizer, the binder being present as a plastisol, the plastisol being composed substantially of PVC and plasticizer and optionally other supplements and/or additives. The modeling compound can comprise, for example, at least one filler as a further supplement and/or additive.

A modellable compound is present when the content of plasticizer in the mixture is adjusted such that the plasticizer attaches itself to the surface of the PVC particles and is stored in the intermediate spaces between the solid particles in a content, so that a kneadable resistance is formed. If the plasticizer content is too low, that is, the plasticizer only accumulates on the surface of the solid particles without also being present in the intermediate spaces, the compound is too hard or very difficult to knead.

If, on the other hand, the surfaces of the solid particles and the intermediate spaces between the solid particles are completely covered or even oversaturated with plasticizer, the resulting modeling compound would flow too much and would therefore no longer be able to be modeled.

Heat must be supplied in order to convert the now modeled subject matter and objects into a permanently solid state. This is referred to as so-called bake hardening. The plasticizer or the plasticizer content is responsible for the hardening process, which allows the compound to harden due to interactions with the PVC.

However, it has been shown that the plasticizer has a certain affinity for the PVC granules or PVC solid particles even when stored at room temperature and ensures that the PVC granules, which partly consist of agglomerates, break down, thus generating new surfaces/surface areas. The plasticizer, which was stored in the intermediate spaces, migrates through said newly created surfaces to said newly created surfaces. As a result, the hardness of the modeling compound increases because the moldability decreases due to the lack of liquid plasticizer components in the intermediate spaces.

The particular advantages of the compounds according to the invention are that the agglomerate disintegration (=aging process) can be brought forward in the production process using methods according to the invention by mixing at higher temperatures and with larger amounts of plasticizer.

This ultimately improves the storage stability or the increase in hardness of the unhardened compound over time, for example, by adding plasticizers in a targeted manner after the "aging process during the manufacturing process" has been initiated.

A further advantage that has resulted from the increased proportion/content of plasticizers in the modeling compound is that the ability to gel in the system is improved during the hardening process, resulting in greater elasticity after the bake hardening. Surprisingly, it has been shown that the transparency after bake hardening can be significantly increased by mixing at higher temperatures and the associated plasticizer contents and reducing the use of fillers and/or additives.

The binder used, which is essentially in the form of PVC, and the added plasticizer form a plastisol. The PVC can be present, among other things, as an emulsifier-containing or -free emulsion PVC, suspension PVC and microbead suspension PVC or a mixture of the individual PVC types.

Phthalate-free and/or phthalate-containing plasticizers can be used as plasticizers.

The total plasticizer content is between 32 and 60% by weight, in a preferred embodiment between 35 and 55% by weight and in a particularly preferred embodiment between 38 and 52% by weight.

The phthalate-free plasticizer is based on citric acid, adipic acid and/or benzoate ester.

The phthalate-free plasticizer is, for example, acetyl tributyl citrate, tri(2-ethylhexyl) acetyl citrate, trioctyl citrate, tridecyl citrate, tributyl citrate, trihexyl citrate, triethyl citrate, dioctyl adipate, diisodecyl adipate, diisononyl adipate, bis(2-ethylhexyl) adipate, diisononyl 1,2-cyclohexanedicarboxylate, acetic acid esters of monoglycerides, benzoates or a mixture of at least two of said substances. The plasticizer can further belong to the group of benzoates or benzoate esters. Its 2,2,4-triethyl-1,3-pentanediyl dibenzoate and derivatives thereof, triethylene glycol dibenzoate, diethylene glycol dibenzoate, diethylene glycol monobenzoate and/or propylene glycol dibenzoate are mentioned as examples. Any mixtures of all the aforementioned plasticizers are possible.

Examples of phthalate-containing plasticizers are di-2-ethylhexyl phthalate, ditridecyl phthalate and dibutyl phthalate.

Any mixture of phthalate-containing plasticizers is possible.

It is also possible to use mixtures of plasticizers consisting of phthalate-free and phthalate-containing plasticizers.

A particularly preferred embodiment of the invention is a compound which is free from phthalate-containing plasticizers.

A stabilizer improves PVC stability, that is, it prevents, among other things, the splitting off of hydrogen chloride. Above all, inorganic and organic salts of the metals calcium, zinc, tin, magnesium, sodium and potassium are used for this purpose, for example, calcium stearate, sodium stearate, potassium stearate, zinc stearate, magnesium stearate, tin stearate and/or mixtures of the metal salts.

Inorganic and/or organic fillers which have a particle size<250 pm, preferably less than 100 pm, are substantially used as fillers, for example, kaolin, chalk, silica, talc, aluminum hydroxide and/or powdered clay.

Metal glitter, glitter powder and glitter flakes or mixtures of said substances can be present as further fillers in order to achieve special optical effects, for example.

So-called lightweight fillers can also be used as fillers, or other fillers mentioned can be admixed. Examples of lightweight fillers are hollow spheres, in particular hollow glass microspheres, for example, from the company 3M or Lehmann & Voss. Depending on the content of lightweight fillers, a desired density can be set, which is advantageously in the range from 0.3 to 1.1 g/ml. The size of commercially available lightweight fillers can also be chosen freely, their size preferably being in a range from 10 to 400 μm.

Furthermore, fillers based on polymers can also be used. PAMA, PMMA and/or polyethylene are named as examples of this group.

Pigments can be present as colorants in pure form, as powder pigments, preferably as azo-free color pigment, effect pigment and/or azo-free coated dye. A large number of possible color pigments includes Pigment Yellow 14 (C.I. 21095), Pigment Red 254 (C.I. 56110), Pigment Orange 34 (C.I. 21110) Pigment Red 122 (C.I. 73915) Pigment Green 7 (C.I. 74260), Pigment White 6 (C.I. 77891), Pigment Black 7 (C.I. 77266), Pigment Red 101 (C.I. 77491), Pigment Violet 23 (C.I. 51319), Pigment Blue 29 (C.I. 77007), Pigment Yellow 185 (C.I. 56290), Pigment Yellow 1 (C.I. 11680), Pigment Red 48:2 (C.I. 15865:2), Pigment Red 53:1 (C.I. 15585:1), Pigment Orange 34 (C.I. 21115), Pigment Yellow 83 (C.I. 21108) and Pigment Blue 15 (C.I. 74160).

The addition of these colorants gives the modeling compound a brilliant appearance.

Pearlescent pigments, mica iron metal luster pigments, polyester glitter pigments and luminescent pigments may be specified as further colorants.

It can be seen here that differently colored kneading compounds can also be blended, mixed or kneaded with one another as desired, resulting in a marbling effect.

The invention is to be illustrated in more detail using a framework example and some formulation examples.

FRAMEWORK EXAMPLE 1

20-68% by weight binder
32-60% by weight plasticizer
0-40% by weight % fillers
0-20% by weight other additives

FRAMEWORK EXAMPLE 2—PREFERRED COMPOSITION 40-68% by weight binder
35-55% by weight plasticizer
0-20% by weight % fillers
0-20% by weight other additives

FRAMEWORK EXAMPLE 3—PARTICULARLY PREFERRED COMPOSITION 45-63% by weight binder
38-52% by weight plasticizer
0-17% by weight % fillers
0-15% by weight other additives Stabilizers, co-stabilizers, colorants and/or fillers are examples of other additives that may be used.

FORMULATION EXAMPLE 1—YELLOW-COLORED MODELING COMPOUND

51% by weight E-PVC and S-PVC
42% by weight plasticizer based on ATBC
6% by weight stabilizer
0.5% by weight filler
0.5% by weight Pigment Yellow 83

FORMULATION EXAMPLE 2—MODELING COMPOUND, TRANSPARENT AFTER HARDENING

48% by weight E-PVC and S-PVC
52% by weight plasticizer based on ATBC

Prior Art—Comparison Formulation According to DE 10 2005 059 143

59% by weight PVC
24% by weight plasticizer based on citric acid
1% by weight stabilizers
7% by weight co-stabilizers
4% by weight filler
1% by weight Pigment Red 254

The preferably used phthalate-free plasticizer is based on citric acid and/or adipic acid.

A desired consistency of the compound can easily be adjusted by varying the binder content and/or plasticizer content.

The present invention is to be illustrated in more detail using the following tables.

TABLE 1

Increase in hardness of the unhardened compound as a function of time at 40° C.

| | 30 days/40° C. | 90 days/40° C. |
|---|---|---|
| Composition according to the invention Formulation Example 2 | Delta H 10% | Delta H 13% |
| Prior art compound Comparative example | Delta H 245% | Delta H 386% |

It has been shown that the compound that has not yet hardened in the oven according to the application documents compared to the prior art, when stored at 40° C. over time (30 or 90 days), has a significantly lower increase in hardness, as shown in Table 1.

TABLE 2

Flexibility of the hardened compound.

| | Flexibility/deflection to break in mm |
|---|---|
| Composition according to the invention Formulation Example 2 | 28 |
| Prior art compound Comparative example | 6 |

These higher breaking strengths could be determined and confirmed with a "texture analyzer". Round fracture bars having a length of 10 cm and a diameter of 1 cm are produced as test specimens.

The method according to the invention for producing such modeling compounds is described below.

The background to the method according to the invention is that the mixing process of the individual components in the compound takes place at an elevated temperature of around 55 to 70° C., preferably around 58 to 65° C. As a result, agglomerate disintegration is initiated during the mixing process, as a result of which an increased content of plasticizer is or can be added to the solid phase of the PVC. More plasticizer can be added/introduced during the mixing process due to the early generation of new surfaces, caused by the agglomerate disintegration.

The method/process for producing the compound according to the invention can be described as follows.

In this process, PVC powder and the amount of plasticizer with any other supplements and/or additives are added to the mixing process at a mixing temperature of around 55 to 70° C.

The components of the compound in the method include 20-68% by weight binder, 32-60% by weight plasticizer, 0-40% by weight fillers and 0-20% by weight other additives The preferred components of the compound in the method include 40-68% by weight binder, 35-55% by weight plasticizer, 0-40% by weight fillers and 0-20% by weight other additives The most preferred components of the compound in the method include 45-63% by weight binder 38-52% by weight plasticizer 0-17% by weight % fillers 0-15% by weight other additives By accommodating/introducing a higher amount of plasticizer into the PVC system of the modeling compound, the increase in hardness of the modeling compound is reduced over time, thus significantly improving the storage stability.

It has surprisingly been found that the more plasticizer that is added to the PVC powder, the higher the resulting flexibility of the compound after the hardening process. Said higher plasticizer content increases the flexibility of the hardened compound meaningfully/significantly.

In addition, it has surprisingly been shown that a higher transparency can also be achieved by the method according to the invention.

The composition according to the invention is used in the production of plastic, manually deformable and heat-hardenable compounds, as modeling compounds for use by children and for the production of craft and/or industrial objects and the products made therefrom, such seal impressions and jewelry.

The compound or modeling compound is further used for therapeutic purposes in the medical field to train and rehabilitate haptic abilities.

Articles and objects that are produced with a composition according to the invention are hardened by the action of heat after shaping to form the articles and objects.

The invention claimed is:

1. A method for producing an oven-hardenable modeling clay including a binder and a plasticizer, the binder and the plasticizer being a plastisol, the plastisol consisting essentially of PVC and plasticizer, wherein the plasticizer is a phthalate-free plasticizer, wherein the modeling clay comprises:

45-63 wt. % binder, 38-52 wt. % plasticizers, 0-17 wt. % filler, 0-15 wt. % other additives, the method comprising the steps of:

mixing a PVC powder, having surface areas and containing agglomerates, and an amount of plasticizer with any other supplements and/or additives at a mixing temperature of 58 to 65° C. to initiate agglomerate disintegration during the mixing so as to generate additional surface areas in the PVC powder; adding an additional amount of the plasticizer during the mixing step, wherein the phthalate-free plasticizer is based on citric acid.

2. The method according to claim 1, wherein the phthalate-free plasticizer is acetyl tributyl citrate, tri (2-ethylhexyl) acetyl citrate, trioctyl citrate, tridecyl citrate, tributyl citrate, trihexyl citrate, triethyl citrate, or a mixture of at least two of said substances.

3. The method according to claim 1, wherein the filler is inorganic.

4. The method according to claim 1, wherein the filler is organic.

5. The method according to claim 1, wherein the filler is kaolin, talc, chalk, silicic acid, aluminum hydroxide, powdered clay and/or a lightweight filler.

6. The method according to claim 1, including a colorant as a pigment, as a powder pigment, effect pigment and/or as an azo-free coated dye.

7. The method according to claim 6, wherein the powder pigment is an azo-free color pigment.

* * * * *